INVENTOR
Eduard R. de Vries

BY Karl W. Flocks
ATTORNEY

United States Patent Office 3,288,618
Patented Nov. 29, 1966

3,288,618
COLORED REFLECTIVE COATING COMPOSITION
Eduard R. De Vries, Huntingdon, Pa., assignor to Prismo Safety Corporation, Huntingdon, Pa., a corporation of Pennsylvania
Filed Aug. 16, 1962, Ser. No. 217,436
1 Claim. (Cl. 106—148)

The present invention relates to reflective marking materials and more particularly to novel reflectively coated glass beads and their use in markers.

It has been previously proposed to utilize clear glass beads in reflective markers and it has also been proposed to utilize glass beads which have been reflectively coated with a metal such as silver or aluminum. It has likewise been proposed to coat glass beads with transparent coatings.

It is the object of the present invention to provide novel reflectively coated glass beads.

It is a further object of the present invention to provide novel reflective markers utilizing the novel reflectively coated glass beads.

Other objects and the nature and advantages of the instant invention will be apparent from the following description taken in conjunction with the accompanying drawings wherein.

Figure 1:
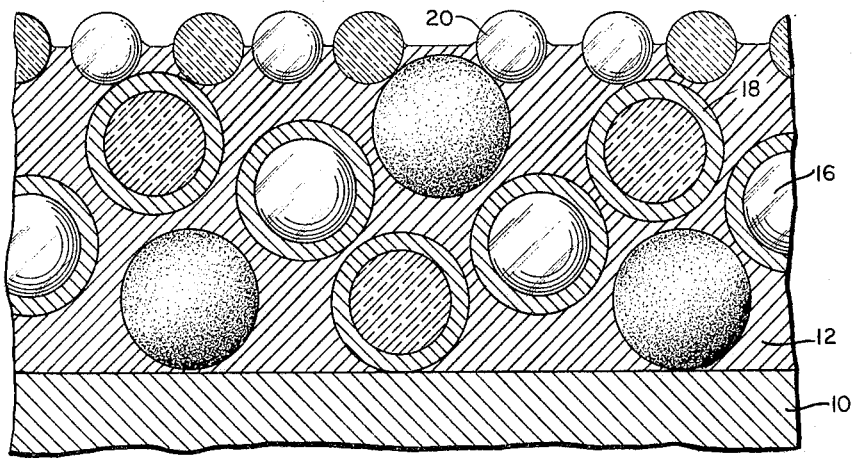
FIG. 1 is an enlarged diagrammatic cross-sectional view through a marker made in accordance with the present invention.

Referring to the drawings, the marker shown in FIG. 1, which may be a highway lane line or a sign for example, includes a base 10 containing a coating layer of a binder 12 containing a plurality of coated glass beads 16 each of which is coated with a coating layer 18. A layer of uncoated glass beads 20 are partially embedded in the upper surface of the binder.

Figure 2:
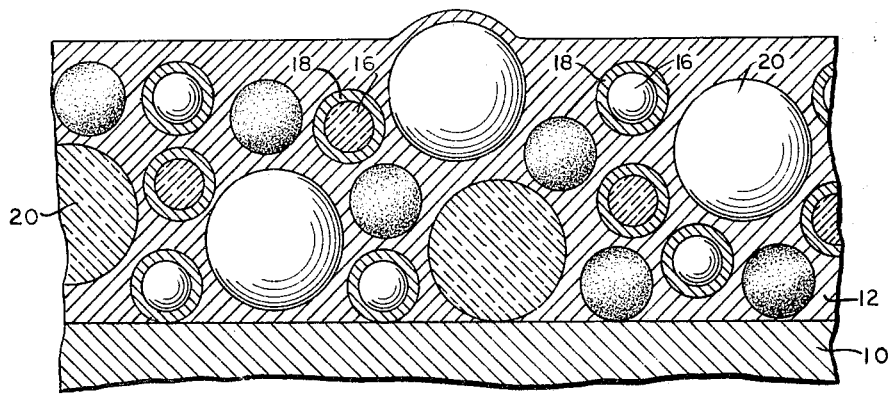
FIG. 2 is a similar view of a modified form of the invention.

The marker shown in FIG. 2 is similar to that shown in FIG. 1 except that uncoated glass beads 20 are included in the binder 12 along with the coated beads 16.

Figure 3:
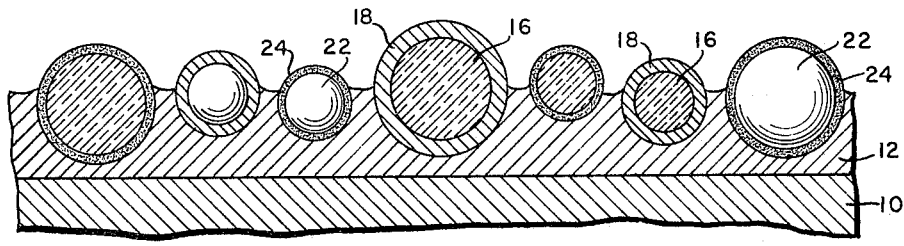
FIG. 3 is a similar view of a further modified form of the invention.
Figure 4:
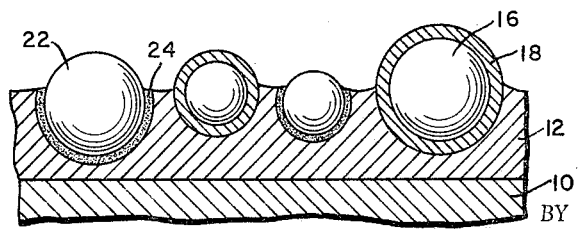
FIG. 4 is a view similar to FIG. 3 showing the marker after it has been exposed to traffic.

The marker shown in FIGS. 3 and 4 shows a binder layer 12 on a base 10 onto which have been dropped a plurality of beads some of which are coated with a pigmented resin composition 18 and some of which are silvered beads 22. These beads are dropped on before the binder layer has cured and after curing they remain partially embedded therein. The exposed silvered coatings 24 may be removed by acid treatment to yield a marker as shown in FIG. 4.

In accordance with the present invention an improved marker is obtained by coating the usual glass beads used in traffic marking with a pigmented resin composition. After curing of the resin composition and drying until the coated beads are free flowing, the coated beads are incorporated into a transparent or pigmented binder.

The glass beads which may have a diameter varying from ½ to 50 mils are preferably coated with a pigmented curing catalyzed epoxy resin system, although other resin systems may be used.

For example, an opaque epoxy resin coating composition for the glass beads may be:

| | Parts by weight |
|---|---|
| Epoxy resin (Epon 828) | 100 |
| Curing agent (diethylene triamine) | 50 |
| Pigment | 50 |
| Diatomaceous earth extender | 25 |
| Methylene chloride | 50–100 |

The glass beads are coated with the epoxy resin composition by any suitable means, such as spraying followed by drying under heat to cure the resin and yield free flowing coated beads. The glass beads and coating composition may be sprayed together through a flame. Other methods of coating may be utilized so long as the beads remain free flowing and do not agglomerate.

Glass beads may be coated satisfactorily by use of a slurry of a solvent solution of the epoxy resin, for example, incorporating the curing agent. The slurry is filled with an excess of glass beads, kept in continuous mechanical agitation, with heating until the solvent has evaporated and a hard resin coating has formed on the glass beads. To prevent the glass beads from sticking together during this coating operation, it is essential to use an excess of the glass beads.

The glass beads may be coated with pigmented resin compositions other than epoxy resins. For example, the coating resin may be a pigmented polyester resin composition, thermosetting polystyrene resins, and other thermosetting resins which solidify rapidly. Softer lacquer coatings such as cellulose-type resins may also be used such as nitrocellulose, cellulose acetate, ethyl cellulose, styrene-butadiene, chlorinated rubber, etc. in a suitable solvent.

Another example of a coating composition for the glass beads may be:

| | Parts by weight |
|---|---|
| Epoxy resin (Epotuf 6140) | 800 |
| Phenyl glycidyl ether | 150 |
| Titanium dioxide | 200 |
| Asbestine | 400 |
| Boron trifluoride amine complex | 5 |

Another example of a suitable coating composition is:

| | Parts by weight |
|---|---|
| Polyester resin composition | 100 |
| Titanox RA | 30 |
| Benzoyl peroxide | 5 |

The epoxy resins employed in accordance with the present invention are commonly referred to as poly glycidyl ethers of polyhydric alcohols and glycidyl ethers of bis-phenols, characterized by the following general formula:

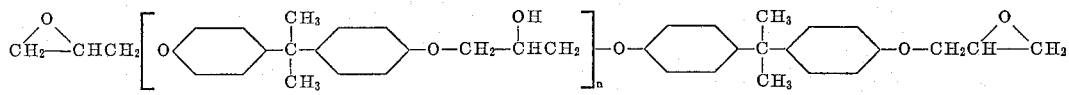

wherein $n$ represents the extent of copolymerization and varies between 0 and 10 indicating molecular weights of 400 to approximately 8000. These products contain both epoxide and hydroxyl groups capable of further reaction. It is the combination of these groups with the curing agent that results in the cured resin systems. Various amines, such as ethylene diamine, triethylene tetramine, dimethyl amino methyl phenol, tri (dimethyl amino methyl) phenol, diamino diphenyl sulfone, metaphenylene diamine, and diethyl aminopropylamine, acid anhydrides, organic sulfonic acids, dibasic acids and resins, such as polyamides, are typical curing agents.

The epoxy resins are commercially sold by Shell Chemical Corp. under the tradenames of Epons. Epon 828, for example, has a melting point of 8–12° C. and an epoxide equivalent ranging between 190–210. By the epoxide equivalency is meant the average number of 1,2-epoxy groups contained in the average molecule. It is expressed in the trade as the grams of the polymeric material or resin containing one gram equivalent of epoxide.

It should be understood that the epoxy resins suitable for use in this invention are not limited to those described above. Any resinous material containing reactive epoxy groups whether aliphatic or aromatic, may be used so long as the material will cure in the presence of curing agents to a solid condition. For example, a dicyclo-diepoxy carboxylate resin may be used which is sold by Union Carbide and Carbon Co. as Epoxide 201.

The pigment is added to the binder to impart reflection to the compostion as well as color and opacity. To produce a white reflecting composition, it is necessary to have a prime pigment, such as rutile titanium dioxide, to furnish the necessary whiteness and opacity. In place of the rutile titanium dioxide, anatase titanium dioxide may be substituted. Other pigments that may be used for white and colored compositions are as follows: aluminum oxide, iron oxide, silicon carbide, antimony oxides, lead oxide, lead chromates, zinc chromates, cadmium pigments, siennas, umbers, inorganic or organic reds, chrome yellows, chrome oranges, chrome greens, etc. The pigments can be extended with barium sulphate, calcium sulphate, magnesium silicate, zinc oxides, zinc sulphide, normal or high strength lithopones, diatomaceous silica, amorphous and crystalline silica, micaceous materials, barium sulphate, whiting, wollastonite pumices, calcium carbonate, clay, talc, perlite, asbestos, granular marble, sand, glass cullet, and other natural or manufactured granular materials.

The dry coated beads may then be utilized in various ways. These beads may be utilized as a bulk filler in traffic and other paints in place of the usual pigments such as red lead, titanium dioxide, chromates, etc. The pigmented epoxy resin coating adheres well to the glass beads and does not abrade off. The coated beads are much less expensive than an equivalent volume of the usual pigments. When used as pigment, the glass beads are generally of the smaller variety, e.g. ½–10 mils.

When the glass beads are coated with a pigmented softer lacquer which is designed to wear off of the beads with abrasion, another usage is contemplated. Such coated beads can be pre-mixed with a transparent binder and used as a traffic paint. The coated beads act as the pigment for the binder and further when used as traffic lines when the upper surface of the exposed beads is worn off by abrasion of traffic, the exposed beads exhibit retroreflective properties.

When a pre-mix of a transparent binder and the coated glass beads is sprayed or otherwise applied onto a surface, immediate retro-reflectivity at night may be obtained by dropping onto the tacky binder a plurality of uncoated glass beads as shown in FIG. 1. The light focuses through the uncoated glass beads onto the surface of the opaque coated bead and is reflected back to the source of light.

It is essential that the coating on the glass beads be completely insoluble in the solvent in the binder. For example, if an epoxy resin is used as the coating on the beads, naphtha can be used as the solvent in the binder with good results.

The clear transparent binder into which the coated beads may be mixed is preferably a thermoplastic binder. Examples are acryloids, such as acrylic and methacrylic resins, cellulose nitrate resins, ethyl cellulose resins, vinyl resins, casein and other synthetic or natural resins. Alkyd resins can also be used. Examples of transparent binders are given in the Shuger Patents 2,268,537 and 2,275,597. Omission of the pigments specified will yield suitable transparent binders.

The pigmented softer lacquer coating compositions for the glass beads may also be similar to those disclosed in the above-mentioned Shuger patents.

It is also contemplated to make a pre-mix of a transparent binder as referred to above containing relative large uncoated clear glass beads, e.g. 10–50 mils, together with relatively very small coated beads, e.g. ½–10 mils. The uncoated glass beads should have a high refractive index, preferably 2.4 minimum.

It is further contemplated that a mixture of the pigmented resin coated beads and silvered beads can be used as a drop on for signs. The exposed silvered surfaces can be removed by acid treatment, thus giving a surface having good day-light appearance and excellent night-time reflex-reflectivity even with a transparent binder holding the beads.

The proportions of the coated beads added can vary over a wide range. When the coated beads are added as the pigment substitute the ratio by volume of the coated beads to the total non-volatile portion of the binder can be up to 50%. In addition to this, approximately 3–8 lbs., of clear uncoated beads or of the silvered beads can be added per gallon of binder.

It will be obvious to those skilled in the art that various changes may be made without departing from the spirit of the invention and therefore the invention is not limited to what is shown in the drawings and described in the specification, but only as indicated in the appended claim.

What is claimed is:

A reflective coating composition comprising a transparent binder material containing a sufficient number of opaque cured reflectively colored abrasive resistant resin coated glass beads having diameters in the range of ½–10 mils to constitute a color pigment in the binder material and a plurality of relatively larger uncoated transparent retroreflecting glass beads having diameters in the range of 10–50 mils.

References Cited by the Examiner

UNITED STATES PATENTS

| | | |
|---|---|---|
| 1,879,799 | 9/1932 | Glaesel. |
| 1,986,591 | 1/1935 | Meyer. |
| 2,133,988 | 10/1938 | Harshberger. |
| 2,268,537 | 12/1941 | Shuger. |
| 2,355,430 | 8/1944 | Flood. |
| 2,379,741 | 7/1945 | Palmquist _____ 88—82 |
| 2,440,584 | 4/1948 | Heltzer et al. _____ 88—82 |
| 2,574,971 | 11/1951 | Heltzer. |
| 3,005,790 | 10/1961 | Wynn et al. |
| 3,025,764 | 3/1962 | McKenzie _____ 88—82 |
| 3,043,196 | 7/1962 | Palmquist et al. _____ 88—82 |
| 3,065,559 | 11/1962 | McKenzie _____ 88—82 X |
| 3,099,574 | 7/1963 | Bernier _____ 117—27 X |
| 3,175,935 | 3/1965 | Vanstrum _____ 88—82 X |
| 3,176,420 | 4/1965 | Alverson _____ 88—82 X |

FOREIGN PATENTS 594,400   3/1960   Canada.

JEWELL H. PEDERSEN, *Primary Examiner.*

D. J. HOFFMANN, T. L. HUDSON, O. B. CHEW,
*Assistant Examiners.*